United States Patent Office 3,411,879
Patented Nov. 19, 1968

3,411,879
PURIFICATION OF AQUEOUS
HYDROCHLORIC ACID
Robert E. Whitfield, Pleasant Hill, Calif., assignor to The Dow Chemical Company, Midland, Mich., a corporation of Delaware
No Drawing. Filed Sept. 17, 1965, Ser. No. 488,238
3 Claims. (Cl. 23—154)

ABSTRACT OF THE DISCLOSURE

This invention relates to a method for the removal of flouride ions from aqueous solutions of hydrochloric acid containing the same by contacting such hydrochloric acid solutions with silica gel or alumina and subsequently regenerating said silica gel or alumina with an aqueous base.

---

This invention relates to a process for the purification of aqueous hydrochloric acid and more particularly relates to a process for the removal of fluoride ions from aqueous hydrochloric acid containing the same.

Aqueous hydrochloric acid containing a fluoride ion impurity is a common chemical plant product derived from processes such as the fluorination of the chlorocarbons. It has long been desirable to remove the fluoride ions from such aqueous acid, but until now no suitable process has been available.

It is an object of this invention to provide a process for the removal of fluoride ions from aqueous solutions of hydrochloric acid. It is an additional object of this invention to provide a process for the removal of fluoride ion impurity from aqueous hydrochloric acid with a treating agent which may be easily regenerated. These and other objects and advantages of the process will be readily appreciated and better understood by reference to the following detailed specification.

It has now been discovered that fluoride ions may be removed from aqueous hydrochloric acid containing the same by contacting said acid with a treating agent selected from the group consisting of silica gel and activated alumina.

The process of this invention may be carried out at temperatures from the boiling point of the aqueous acid to its freezing point, but a temperature at or near room temperature, e.g. 20° C. to 40° C. is usually preferred. Increased or decreased pressure may be used to increase or decrease the boiling points of the aqueous acid but atmospheric pressure is usually preferred. Due to the known corrosive nature of aqueous hydrochloric acid, it is necessary to conduct this process in equipment which is acid resistant at the temperature and pressure employed.

Aqueous hydrochloric acid containing up to 44% by weight HCl and containing fluoride ion impurities may be purified by the process of this invention.

Activated alumina useful herein includes any highly porous form of aluminum oxide. Such activated alumina may be in the usual anhydrous form or even in one of its hydrated states since it will be employed in an aqueous system. The particle size employed is not critical to effective operation as a treating agent but a particle size of from 3 to 200 mesh (standard screen size) is conveniently employed. Silica gel is a preferred treating agent and it may also be employed in a wide range of particle sizes.

As the action of the treating agents to remove fluoride ion from aqueous hydrochloric acid occurs very rapidly, it is necessary only that good contact be made between the fluoride ion-containing aqueous hydrochloric acid solution and the treating agent. Such contact may be achieved by any suitable manner, e.g. by agitating a mixture of the solid treating agent with the acid to be treated or by passing the fluoride-containing acid through a bed of treating agent.

The capacity of the treating agent to remove fluoride ions will show a decrease after a period of use. Such capacity may be readily regenerated, however, by contacting the treating agent with dilute aqueous base, such as NaOH, KOH, $NH_4OH$, $Ca(OH)_2$, $Mg(OH)_2$, $Ba(OH)_2$, and the like. It is usually preferred to employ a base being between 0.1 N and 0.5 N in concentration and such base is generally employed in at least a small excess over the amount theoretically required to react with the fluoride ion contained in the treating agent. More concentrated solutions of the base may be employed but no advantage is gained thereby and some backing of the treating agent may occur. After contact with the base, the treating agent is washed with water to remove the base and may again be used to remove fluoride ion from aqueous hydrochloric acid solutions. Such regeneration may be repeated as many times as needed without detrimental effect on the capacity of the treating agent to remove fluoride ions from hydrochloric acid containing the same.

In order to provide ease in understanding, the following examples are set forth to illustrate the invention but are not to be construed to limit the scope thereof.

EXAMPLE 1

A 400 ml. sample of aqueous hydrochloride acid containing about 32% by weight HCl and 306 p.p.m. fluoride ion was added to a beaker containing 100 cc. of activated alumina having a standard mesh size of 80–200. The activated alumina employed was Alcoa Grade F–20 which had been treated with HCl to remove any $Fe_2O_3$ therefrom. The mixture was stirred for 120 minutes, filtered and the filtrate analyzed for fluoride ion. Analysis showed the treated acid solution to contain 3 p.p.m. fluoride ion.

EXAMPLE 2

A 400 ml. sample of aqueous hydrochloric acid containing about 32 weight percent HCl and 250 p.p.m. of fluoride ion was added to a beaker containing 100 cc. of silica gel having a particle size of 3–8 mesh (standard screen size). The mixture was stirred for 120 minutes and filtered. Analysis of the treated aqueous hydrochloric acid showed it to contain from 4 to 6 p.p.m fluoride ion.

EXAMPLE 3

A 50 ml. burette was packed with 3–8 mesh silica gel which had been previously saturated with aqueous hydrochloric acid containing 37 weight percent HCl. Aqueous hydrochloric acid containing about 32 weight percent HCl and 306 p.p.m. fluoride ion was passed through the silica gel packed column at the rate of 2 cc./min. which is equivalent to 0.6 p.p.m. $F^-/ft.^2$. Analysis of the effluent acid showed it to contain 6 p.p.m. fluoride ion. After 1050 cc. of aqueous acid had passed through the column, the silica gel treating agent was regenerated by flushing the column with water to remove the acid therefrom, passing 0.2 N NaOH through the column until the effluent was free of fluoride ion and again flushing with water.

After the regeneration, an additional 1050 cc. of the same fluoride-containing acid was passed through the column with reduction of fluoride ion to 6 p.p.m.

Three additional acid treatments and regenerations had no effect on the activity of the silica gel treating agent.

Various modifications can be made in the present invention without departing from the spirit or scope thereof

I claim:

1. A process for the removal of fluoride ions from aqueous hydrochloric acid containing the same which comprises
   (a) supplying a vessel containing a treating agent consisting of activated alumina or silica gel,
   (b) passing aqueous hydrochloric acid containing fluoride ions through the treating agent until the capacity of the treating agent to remove said fluoride ions is substantially depleted, said depletion of capacity being indicated by chemical analysis of the effluent aqueous hydrochloric acid,
   (c) flushing the depleted treating agent with water to substantially remove the aqueous hydrochloric acid,
   (d) passing dilute aqueous NaOH through the treating agent to regenerate said treating agent by removing fluoride ions therefrom, said dilute aqueous NaOH having a concentration in the range of about 0.1 N to about 0.5 N,
   (e) flushing the treating agent with water, and
   (f) repeating the above steps (b), (c), (d), and (e) for a plurality of times.

2. The process of claim 1 wherein the treating agent is activated alumina.

3. The process of claim 1 wherein the treating agent is silica gel.

References Cited

UNITED STATES PATENTS

| | | | |
|---|---|---|---|
| 2,526,776 | 10/1950 | Smith et al. | 23—154 |
| 2,526,777 | 10/1950 | Smith et al. | 23—154 |
| 2,919,174 | 12/1959 | Pring | 23—154 XR |
| 2,920,941 | 1/1960 | Sanlaville et al. | 23—154 |
| 3,074,779 | 1/1963 | Quin | 23—154 |
| 3,140,916 | 7/1964 | Lowdermilk | 23—154 |
| 3,057,681 | 10/1962 | Gernes et al. | 23—88 |

FOREIGN PATENTS 960,261  6/1964  Great Britain.

OTHER REFERENCES

"Handbook of Chemistry," by N. A. Lange, 10th ed., 1961, pp. 302 and 303, McGraw-Hill Book Co., Inc., N.Y. (TP 151 H 25, 1961, C. 3).

Hackh's "Chemical Dictionary," 3rd ed., revised, 1944, pp. 39, 40, and 781, McGraw-Hill Book Co., Inc., N.Y.

OSCAR R. VERTIZ, *Primary Examiner.*

E. STERN, *Assistant Examiner.*